Dec. 12, 1961 H. P. THOMAS 3,013,122

MULTIPLEX SYSTEM

Filed Jan. 5, 1955

3 Sheets-Sheet 1

INVENTOR:
HENRY P. THOMAS,

BY Julius J. Zaskalicky
HIS ATTORNEY.

Dec. 12, 1961 H. P. THOMAS 3,013,122

MULTIPLEX SYSTEM

Filed Jan. 5, 1955

3 Sheets-Sheet 2

INVENTOR:
HENRY P. THOMAS,

BY Julius J. Zaskalicky
HIS ATTORNEY.

Dec. 12, 1961

H. P. THOMAS

MULTIPLEX SYSTEM 3,013,122

Filed Jan. 5, 1955

3 Sheets-Sheet 3

INVENTOR:
HENRY P. THOMAS,

BY Julius J. Zaskalicky
HIS ATTORNEY.

United States Patent Office 3,013,122

Patented Dec. 12, 1961

3,013,122

MULTIPLEX SYSTEM

Henry P. Thomas, Fayetteville, N.Y., assignor to General Electric Company, a corporation of New York Filed Jan. 5, 1955, Ser. No. 479,911
7 Claims. (Cl. 179—15)

My invention relates to multiplex systems and more particularly to that type of such systems referred to as pulse position multiplex. In these systems successive trains of pulses are transmitted and corresponding pulses of each train are modulated by a respective signal whereby as many signals are transmitted as there are pulses in the successive trains.

One of the objects of my invention is to provide certain improvements in pulse multiplex systems, particularly as to the manner of generating the different pulses and in the manner of maintaining necessary synchronism between the transmitting and receiving apparatus of the system.

Another object of my invention is to provide an improved relay apparatus.

A further object of my invention is to provide an improved pulse generating system for multiplex system apparatus.

A still further object of my invention is to provide improved signaling means in pulse multiplex systems.

Briefly stated, a pulse multiplex system in accordance with my invention comprises a source of oscillations of a predetermined frequency coupled to a plurality of phase shift networks from each of which is derived oscillations of a different phase. The output potentials of the several phase shift networks are combined in such a manner that a plurality of keying or enabling impulses are derived, each such impulse occurring in time correspondence with the displacement in phase of the oscillation producing the impulse. Each of the keying or enabling impulses are utilized to condition each of a plurality of channels in transmitting and receiving apparatus of the pulse multiplex system.

The novel features which I believe to be characteristic of my invention are set forth with particularity in the appended claims. The invention itself, however, both as to its organization and method of operation, together with further objects and advantages thereof may best be understood by reference to the following description taken in connection with the accompanying drawings in which:

Figure 1:
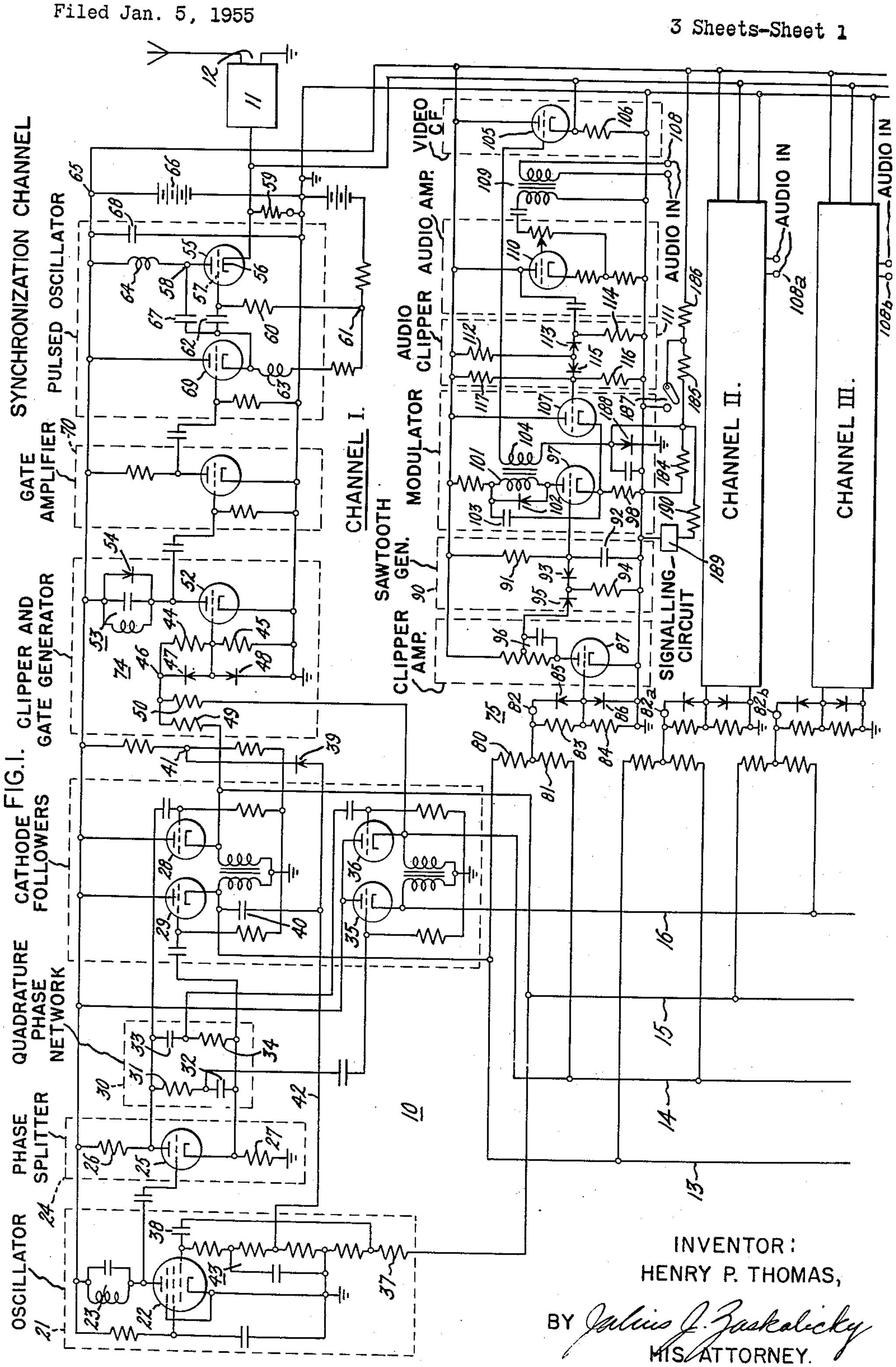
FIG. 1 is a schematic diagram partly in block form of a complete pulse multiplex type transmitter embodying the present invention.

Referring now to FIG. 1 of the drawings, the transmitter there represented is of the type which radiates a carrier wave wherein several messages are conveyed on a time-sharing basis, that is, by pulse multiplexing. It includes an oscillator and phasing network system 10 coupled to each of a group of channels including a synchronization channel, designated by that legend on the drawing and message channels identified in the drawing as channels I, II, and III, respectively. Although but three message channels have been shown, it must be understood that additional ones may be employed.

The several channels serve to generate reference or synchronization and individual message carrying pulses and are coupled to an amplitude modulator or pulser and radio frequency transmitter 11. Unit 11 may be of any well known construction for supplying to an antenna-ground system 12 a radio frequency carrier wave that is amplitude modulated by or keyed on in response to the pulses from the several channels. The antenna thus radiates successive trains of a pulsed carrier and corresponding pulses of each train convey a respective one of several message signals. Of course, the trains are repeated at a rate sufficiently rapid to carry the several messages.

As illustrated at the left extremity of the figure, an oscillator with phasing networks is provided and functions to develop on each of conductors 13, 14, 15 and 16, a respective oscillation of the same frequency but of different phase. Preferably, the oscillations on each of the conductors 13, 14, 15 and 16, are substantially in quadrature phase with respect to the next succeeding numbered conductor. The sine wave oscillation on each of these conductors may, for example, have a frequency of nine kilocycles and a form such as represented by graph *a* of FIG. 3 which illustrates the various waveforms of the multiplex system plotted to a common time scale. Curves 17, 18, 19 and 20 represent respectively the sine waves appearing on conductors 13, 14, 15 and 16.

The wave generating circuit 10 comprises an oscillator portion 21 including an electron discharge device 22 in the anode circuit of which is included a parallel resonant circuit 23 tuned to the frequency of the oscillations desired. The output from the device 22 is capacitively coupled to the phase splitter 24 which includes electron discharge device 25 in the anode circuit of which is included a resistance 26 substantially equal to a resistance 27 in the cathode circuit of this device. Thus, between the anode of device 25 and ground is obtained a wave of one phase, which is applied to the cathode follower stage 28 from which is obtained the wave 19 of graph *a* of FIG. 2. The output appearing between the cathode of device 25 and ground is capacitively coupled to the cathode follower stage 29 at the output of which is obtained a sine wave displaced in phase from the wave appearing at the output cathode follower 28 by 180 degrees as shown in curve 17.

The output appearing between the anode and cathode device 25 is applied to a quadrature phase network 20. This network includes a resistance 31 and a capacitance 32 connected in series in the order recited between the anode and cathode respectively of the device 25 and also includes a capacitance 33 and a resistance 34 connected in series in that order between the anode and cathode of device 25. The resistance 31 and capacitance 32 are so proportioned that the voltage obtained between their common ends and ground is substantially in phase quadrature with respect to the voltage appearing between the cathode of device 25 and ground. Similarly, the capacitance 33 and resistance 34 are arranged so that the voltage obtained between their common ends and ground is also shifted in phase by substantially 90 degrees with respect to the voltage appearing between the cathode and ground but in the opposite direction. These voltages are capacitively coupled to cathode followers 35 and 36 at the output of which are obtained waves 20 and 18, respectively, 180 degrees out of phase with respect to one another and in phase quadrature with respect to the voltage appearing at the cathode and anode of device 25, respectively.

In order to sustain oscillations in the parallel resonant circuit 23, it is necessary to feed back a voltage to the input of device 22 to sustain these oscillations. The voltage appearing at the output of cathode follower device 28 is substantially in phase with the voltage that need be applied to the grid of device 22 to sustain oscillations in the circuit 23. Accordingly, this voltage is coupled through resistance 37 and capacitance 38 to the grid of device 22.

In order to stabilize the amplitude of the oscillations appearing in the circuit 23, an amplitude limiting circuit is provided. The output at cathode follower 29 is rectified by means of the unilaterally conducting device 39 having one electrode thereof connected through a capacitance 40 to the cathode of device 29 and having the other electrode thereof connected to a predetermined unidirectional potential point 41. Accordingly, when the amplitude of the output from cathode follower 29 exceeds a predetermined level determined by the predetermined potential point 41, rectification occurs which causes the anode of unilaterally conducting device 39 to become negative. The magnitude of this negative potential varies in accordance with the amplitude of the oscillations. This negative potential is supplied over conductor 42 to a grid biasing network 43 which varies the bias on the grid of device 22 in such a direction as to maintain the amplitude of oscillations constant.

Figure 3:
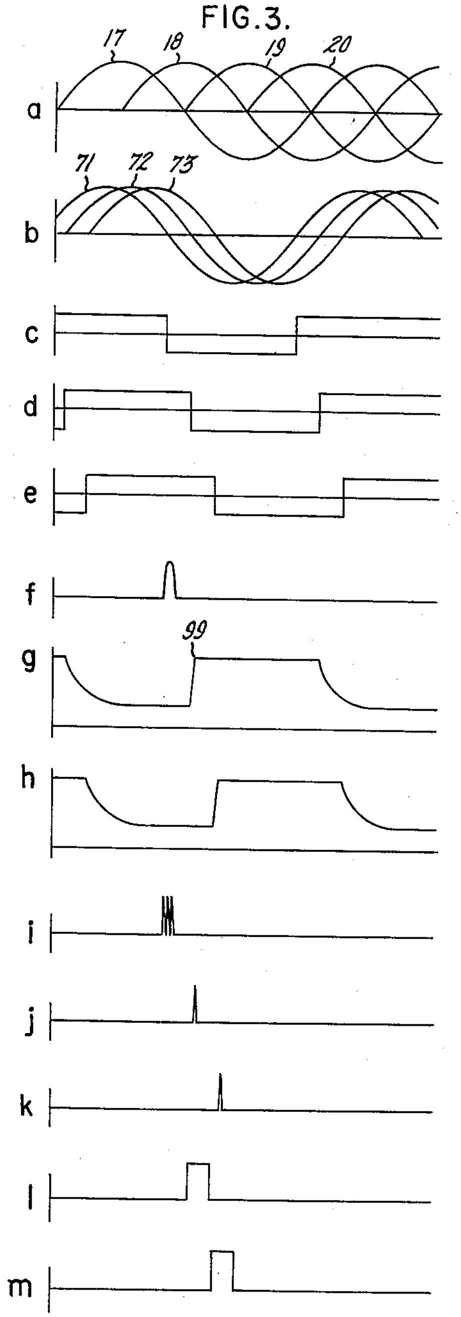
FIG. 3 represents various waveforms useful in explaining the operation of portions of the apparatus illustrated in FIGS. 1 and 2.

The sine wave voltages appearing on the conductors 13, 14 and 15 and 16 are utilized to derive a plurality of sine waves each progressively displaced in phase with respect to an oscillation of reference phase as shown in graph *b* of FIG. 3. The phase of these derived voltages is utilized for the derivation of the reference or synchronization pulses and the individual channel or signal pulses of the system. Curves 71, 72 and 73 of FIG. 3 are utilized for the generation of synchronization pulses and signal pulses of channels I and II respectively.

While only three waves have been shown in this graph for illustrative purposes, it will be understood that as many waves as there are channels in a system are utilized. The duration of one cycle being divided into as many phases as the desired number of synchronization, guard, and signal channels. It will further be understood that the amplitudes and durations of the waves and pulses are not drawn strictly to scale for reasons of clarity. The time of occurrence of the various waves and pulses of these figures, particularly the leading edges thereof, is one of the significant facts brought out by these figures and in this respect the figures are precise representations as will be pointed out as this description proceeds.

Referring now the synchronizing channel portion of the transmitter system of FIG. 1, there is provided a means for deriving a sine wave of reference phase. To this end a portion of the voltage on conductor 15 is combined with a portion of the voltage on conductor 14 to derive a resultant voltage intermediate in phase to the phase of each of the voltages on conductors 14 and 15. This combination is effected by the network comprising a constant impedance clipper network 74 connected between point 46 and ground, resistance 49 connected between conductor 15 and point 46 and resistance 50 connected between conductor 14 and point 46. Constant impedance clipper network 74 comprises resistances 44 and 45 of equal magnitude and connected in series between point 46 and ground. Resistance 44 is shunted by unilaterally conducting device 47 with its cathode connected to point 46 and resistance 45 is shunted by unilaterally conducting device 48 with its cathode connected to ground. Since the resistances 45 and 44 are equal and one of these resistances is short circuited on one half of an alternating cycle of voltage applied between point 46 and ground, and the other is shorted on the other half of the alternating cycle, a constant impedance between the point 46 and ground is presented by the clipper network. Thus, the phase of the voltage appearing between point 46 and ground is determined solely by the relative magnitudes of the resistances 49 and 50. Only the negative halves of the sine wave appearing between point 46 and ground appear across resistance 45 due to the clipping action of diode 48 on positive half cycles. This wave of voltage is clipped or limited in amplitude in the device 52 since the negative wave drives the grid of this device from saturation to cutoff. Thus, the anode current of this device has a form such as shown in graph *c* of FIG. 3. Since the wave applied to the grid of this device has a large amplitude in comparison the grid-cathode cutoff bias the wave is clipped close to its base line with the result that both the leading and lagging edges of the wave of anode current shown in graph *c* coincides with the zero amplitude phase or zero reference points of the applied sine wave. Accordingly, in the parallel resonant circuit 53 in the anode circuit of this device 52 is produced a change in current by the cutoff of device 52 thereby setting circuit 53 into oscillation. The oscillations occurring after the first positive half cycle of oscillation are deleted by the unilaterally conducting device 54 connected in shunt with circuit 53 and poled conductive for the negative half of any oscillations appearing in this circuit, as shown in graph *f* of FIG. 3. It should be noted that the oscillations are referenced to the leading edge of the clipped sine wave applied to device 52. Since the leading edge of the clipped sine wave corresponds to the point of zero amplitude of the sine wave appearing between point 46 and ground, the occurrence of the wave of graph *f* is accurately and precisely tied in with the phase of the original sine wave and is substantially independent of variations in amplitude of the sine waves appearing on conductors 14 and 15. The duration of the pulse as shown in graph *f* is such as to correspond to the interval of the synchronizing pulses of graph *i*.

The synchronizing signal of graph *i* consisting of a group of three closely spaced pulses are developed by the pulse oscillator 55. The oscillator 55 is of the pulsed Hartley type of oscillator and comprises a parallel resonant circuit including capacitance 67 and inductances 63 and 64. The capacitance 67 is connected between the grid 57 and the anode 58 of device 55. The inductance 63 is connected from the grid 57 to ground and to the cathode through load resistance 59. Inductance 64 is connected from the anode 58 through D.-C. isolation and R.-F. bypass capacitor 68 to ground and through the load resistance 59 to the cathode. Capacitance 67 is a blocking capacitor and a resistance 60 is a grid leak resistance and has one end connected to the grid 57 and the other end to a suitable bias potential 61. The parallel resonant circuit of the oscillator is maintained dampened by current flow through inductance 63 in the absence of a pulse applied to the cathode follower 69 since its grid is connected to ground. Upon application of a pulse from the gate generator 52 through the gate amplifier 70 to the pulser cathode follower 69, the latter is rendered nonconductive thereby permitting the oscillator to oscillate over a period of time determined by the duration of the applied pulse. The parallel resonant circuit of the oscillator is arranged so that during this interval three cycles of oscillation are executed by the oscillator. During the execution of these oscillations, grid current is caused to flow in the device 55 charging the blocking capacitance 62 and thereby biasing the device 55 in such a manner that only positive peaks of voltage appear across the cathode resistance 59. Thus, the desired synchronizing signal is directly obtained across resistance 59. It should be noted that the leading edge of the first of the pulses of the synchronizing signal coincides with the leading edge of the keying pulse because of the fact that initially current was flowing through inductance 63. The three short pulses produced in the cathode resistance 59 are coupled to the transmitter device 11.

Referring now to channel I of the signal channels, there is shown a phase shifting network comprising resistances 80 and 81, each having one end connected to conductor 13 and to conductor 14, respectively, and having their adjacent ends connected together and to point 82 of the constant impedance clipper circuit 75 comprising resistances 83 and 84 of equal magnitude connected between point 82 and ground with unilaterally conducting device 85 shunting the resistance 83 in such a direction to permit conduction toward the point 82 and with unilaterally conducting device shunting resistance 84 in a direction to permit conduction through the device to ground. The phase shift network and clipper circuit function to develop a voltage between 82 and ground which is shifted in phase with respect to the voltage appearing between corresponding point 46 and ground in the synchronizing channel as shown at 72 in graph *b* of FIG. 3. This, as explained in connection with the synchronizing channel, is achieved by proportioning suitably resistances 80 and 81. Thus, between the junctions of resistances 83 and 84, and ground is obtained a wave in which the positive portions have been clipped. The negative portions are applied to the device 87, in the anode circuit of which is developed a square wave of the form shown in graph *d* of FIG. 2, it should be observed that the leading and lagging edge of these waves appear substantially at the instant of zero amplitude of the corresponding sine wave. The wave of graph *d* is utilized to synchronize a sawtooth generator 90 from which the desired signal pulses are obtained.

Sawtooth generator 90 is described and claimed in a copending application (4D–576) Serial No. 479,913, filed January 5, 1955, and assigned to the assignee of the present application. The sawtooth generator 90 comprises a resistance 91, a capacitance 92, connected in series across the source 66. A unilaterally conducting device 93 and a resistance 94 are connected in series across the capacitance 92. The unilaterally conducting device 93 is poled to be rendered conductive; thus, the lowest point in potential to which the capacitance 92 may be discharged through the device 93 is determined by the ratio of resistances 91 and 94. When the device 93 is rendered nonconductive, the capacitance 92 charges to the potential of the source at a substantially linear rate. It should be noted that the charging always starts from the same reference potential determined by the resistances 91 and 94. The unilaterally conducting device 93 is rendered nonconductive by the appearance of a positive potential across resistance 94 from the device 87 when the latter is rendered nonconductive. A unilaterally conducting device 95 connected to the anode of device 87 through the biasing network 96 functions to apply this positive potential across the resistance 94 and is so poled. Thus, upon the appearance of a negative pulse on the grid of device 87, the potential of its anode rises, diode 95 passes current through resistance 94 causing the potential thereon to rise rendering diode 93 nonconductive thereby permitting the capacitance 92 to charge through resistance 91 from source 66. Upon disappearance of the negative pulse from the grid of device 87, the anode of device 95 drops in potential thereby dropping the potential across resistance 94. Thus, device 93 again is rendered conductive and device 95 nonconductive thereby capacitance 92 is discharged. Accordingly, across capacitance 92 is developed a sawtooth wave starting from a fixed reference potential determined by the resistances 91 and 94 occurring at the occurrence of the leading edge of the square wave at the output of device 87 which, in turn, occurs at the instant of zero amplitude of the corresponding sine wave as illustrated in graph *g* of FIG. 3. This wave is applied to the modulator device 97, the cathode of which is biased nonconductive by means of the current flowing through the resistance 98 from device 107. When the sawtooth wave which is large in amplitude in comparison to the grid cathode bias potential of device 97 reaches a certain potential, represented by point 99 on graph *g*, the device 97 becomes conductive and is driven to current saturation in a very short interval of time. The pulse of current developed in the device is passed through the primary of transformer 101 which is set into oscillation. The oscillations are clipped by the unilaterally conducting device 102 connected in shunt with the inductance. The output pulse from the anode circuit of device 97 is coupled through secondary 104 of transformer 101 to the grid of cathode follower device 105, across the cathode resistance 106 of which appears the channel or signal pulse as shown in graph *j* of FIG. 3 which, in turn, is coupled to the modulator 11.

The time of occurrence of the signaling pulse of graph *j* may be varied by varying the bias appearing across the resistance 98. This is done by means of device 107 having its cathode connected to the cathode of device 97 and to the grid of which is applied an audio modulating voltage which may represent voice, music, or other desired signals. Thus, the bias appearing across the resistance 98 varies the time of occurrence of the pulse in the device 98 and thereby modulates this pulse in time in accordance with the variations in amplitude and frequency of the audio modulating voltage. The capacitance 103 functions to maintain the anode-cathode potential substantially constant over an audio cycle for varying cathode potentials thereby to assure good pulse position modulation.

The audio modulating voltage is applied to the terminals 108 and coupled through transformer 109 to audio amplifier 110 and to an audio clipper circuit 111 which functions to limit the positive and negative amplitude excursions of the audio voltage to prescribed limits and thereby confining the excursions in time of the signal pulse to the time allotted to that channel.

The clipper circuit 111 includes a resistance 112 connected to the anode of unilaterally conducting device 113, the cathode of which is connected through resistance 114 to ground. The anode of device 113 is also connected to the anode of unilaterally conducting device 115, the cathode of which is connected through resistance 116 to ground. The cathode of unilaterally conducting device 115 is also connected through resistance 117 to the positive terminal of source 66. The input to the clipper is coupled across the resistance 114 and the output of the clipper is taken from resistance 116 and is applied to the grid of device 107. The ratio of resistance 117 to resistance 116 determines the lower limit of clipping, the ratio of resistances 112 and 117 in parallel to resistance 116 determines the upper limit of clipping, and the ratio of resistances 112 and 117 in parallel to resistances 114 and 116 in parallel determines the D.-C. level at output of the clipper in the absence of an applied signal.

Channels II and III are of the same construction as channel I; and hence, are represented by rectangular boxes. Of course, each of these channels is operatively conditioned in sequence by the respective sine waves appearing between terminal 82*a* and ground, and terminal 82*b* and ground. The phase of the waves appearing at these points of course, being different as explained above but bearing a fixed phase relation with the waves at points 82 and 46 as well as a fixed phase relation with the oscillations generated by oscillator 22. This is true irrespective of any variations in frequency of oscillator 22. The phase of the wave appearing at point 82*a* being represented by curve 73 of graph *b* and the corresponding enabling wave being shown in graph *e* of FIG. 3. Individual messages to be transmitted may be applied to the terminals 108*a* and 108*b* so that the time of occurrence of pulses derived in each of channels II and III may be varied in accordance with a particular message to be transmitted. The signal forming pulse from channel II is represented by graph *h* and the corresponding signal pulse by graph *k*.

In a practical embodiment it has been found practical to divide the time interval of a cycle of a 9 kilocycle wave into an interval for the synchronization channel a pair of guard intervals and 25 intervals corresponding to 25 signal channels. The required keying or enabling pulses may be derived by employing a corresponding number of coupling phase shift network elements in addition to those illustrated. The manner of connecting the coupling network of such arrangements to the various dividers to the several channels is believed to be obvious from the material presented hereinbefore.

Thus, at the transmitter 11 of FIG. 1 there is produced a repeating train of pulses, each train of which includes a reference pulse from the synchronization channel followed by signal pulses from channels I, II, and III and so on. These latter pulses are single pulses while the pulses from the synchronization channel are a group of three closely spaced pulses and hence, may be distinguished by the receiving equipment from signal pulses. Preferably, all of the pulses are of the same duration to facilitate subsequent reshaping of the pulses. All of these trains of pulses remain in fixed phase relation to the oscillations generated by device 22 irrespective of any frequency variations in those oscillations. This is important since it avoids the possibility that the last channel of any train become either more closely or less closely spaced to the first channel of the next train upon variation of frequency of oscillator 22 up or down. The phase relation between the pulses of all channels remains fixed to the phase of the oscillations of oscillator 22.

Figure 2:
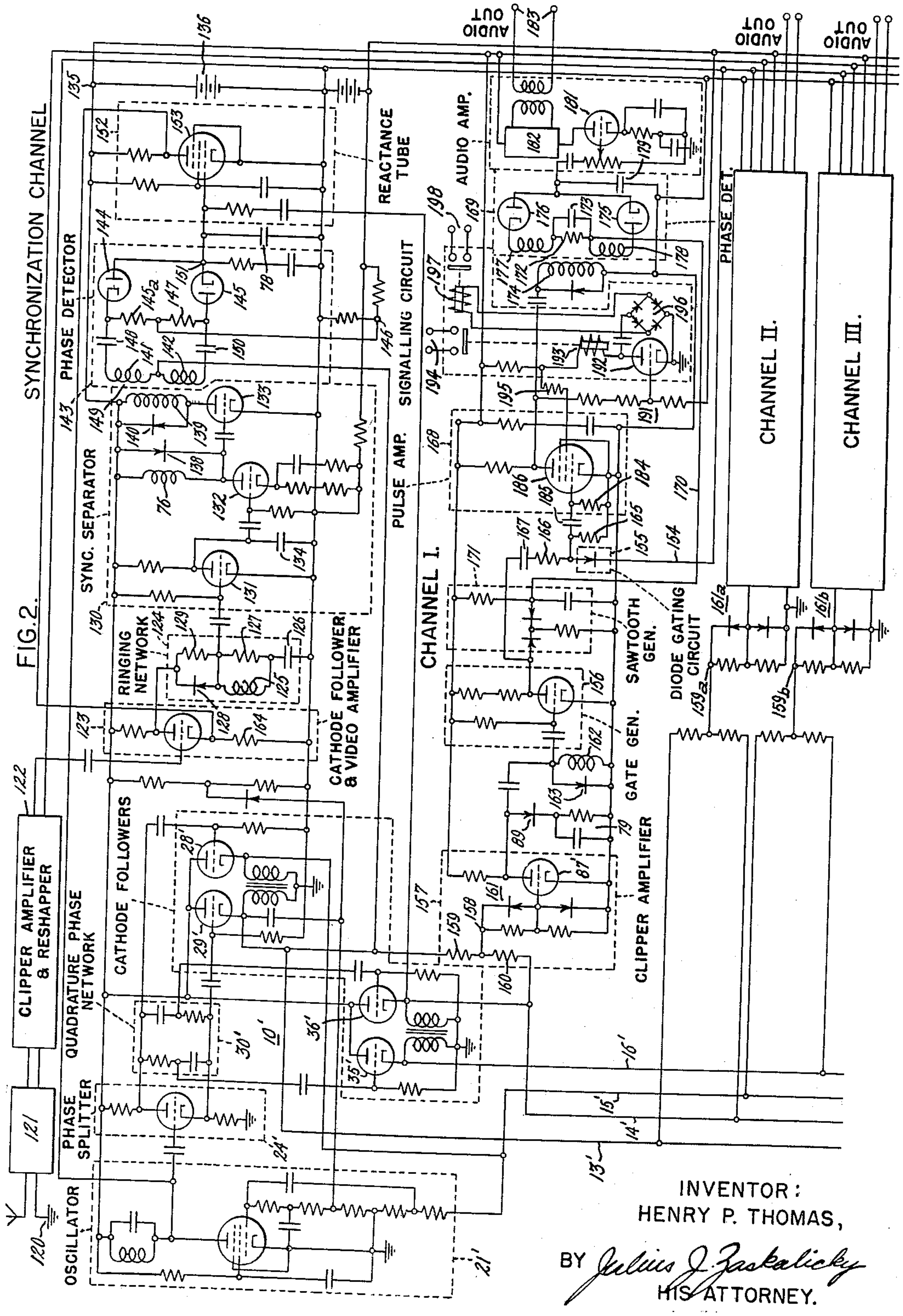
FIG. 2 is a schematic diagram partly in block form of a complete pulse multiplex type receiver which may be utilized in connection with the transmitter of FIG. 1 and which embodies the present invention.

Turning now to the receiving apparatus shown in FIG. 2 of the drawings, the carrier wave from the transmitter of FIG. 1 is intercepted by the antenna-ground circuit 120 and applied to a radio frequency amplifier and detector, wherein the pulse modulation components of the carrier are derived.

These components are applied to clipper, amplifier and reshaper circuit 122 which functions to amplify and reshape the pulses derived from the detector unit 121. The output from the clipper amplifier reshaper unit 122 is applied to the cathode follower video amplifier unit 123, the output of which is applied to each of the aforementioned synchronizing channel and channels I, II, and III which correspond to the similarly designated channels of the transmitter.

The receiver also includes an oscillation generating system 10′ which is substantially identical in construction and operation to the one incorporated in the transmitter, hence, this system and the elements included therein are identified by the same reference characters found in the oscillator and phasing network system of FIG. 1 followed by a prime designation.

The oscillating generating system includes an oscillator 21′, the output of which is applied to a phase splitter 24′ which in turn supplies waves of opposite phase to the quadrature phasing network 30′. The outputs from the phase splitter and the quadrature phasing network are applied to cathode followers 28′, 29′, 35′, and 36′, the outputs of which appear on conductors 13′, 14′, 15′, and 16′, respectively. The outputs appearing on these conductors are, of course, sine waves of the same frequency and in time quadrature relationship as at the transmitter.

Each of these waves are maintained in phase corresponding with the corresponding waves at the transmitter, that is, the phase of the wave of conductor 13′ is arranged to be coincident with the phase of the wave on the conductor 13, etc., by means of a phase control signal derived from the synchronization channel which, in turn, is responsive to the reference or synchronization pulses in the trains of transmitted pulses from the reshaper unit 122. From the waves on conductors 13′, 14′, 15′, 16′, are derived a plurality of sine waves of differing phase for rendering operative each of the channels in a desired time sequence, the phase of the wave applied to channel I being identical to the phase of the wave applied to channel I at the transmitter, and so on. The keying or enabling impulse for the synchronization channel and the signaling channels is derived as in the transmitter with respect to the time of occurrence of zero amplitude of sine wave applied to the respective channel.

Referring now to the synchronization channel portion of the receiver in detail, the output from the video amplifier 123 is applied to a ringing network 124 comprising an inductance 125 and capacitance 126 connected in series resonant relationship with a damping resistance 127 connected in shunt with the inductance. The unilaterally conducting device 128 connected between the anode of the video amplifier 123 and inductance and poled to conduct current to the anode functions to increase the amplitude of the voltage applied to the ringing circuit and in effect short circuits the loading resistance 129 connected in shunt therewith during the applied pulse. The resonant frequency of the ringing network is chosen such that the network essentially broadens the duration of the pulses applied thereto. Thus, the group of three pulses in each synchronizing signal are essentially converted into a single pulse having a duration equal to the interval of the synchronizing signal. These pulses are capacitively coupled to the sync separator unit 130 which includes devices 131, 132, and 133, and which functions to separate the synchronizing or reference pulses from the signal or channel pulses. The pulses from the ringing network 124 being negative in polarity render the device 131 nonconductive thereby permitting capacitance 134 connected in the anode circuit 131 to charge toward the potential of the positive terminal 135 of source 136. Thus, across the capacitance 134 is developed a series of sawtooth waves, comprising a sawtooth wave of large amplitude corresponding to the synchronizing pulses, and a series of sawtooth waves of much smaller amplitude corresponding to the channel pulses. These pulses are applied to the device 132 which is biased sufficiently nonconductive such that only the sawtooth pulses of large amplitude cause conduction therein. Accordingly, upon occurrence of sawtooth pulses of large amplitude, conduction is caused in the anode-cathode circuit of device 132 producing a pulse of current in the inductance 76 and causing the latter to oscillate. The unilaterally conducting device 138 connected in shunt with the inductance 76 essentially deletes oscillation after the first positive half cycle and hence a single positive pulse is produced across this inductance. This pulse is applied to device 133 in the anode circuit of which is connected an inductance 139 shunted by a unilaterally conducting device poled to be conductive from the anode of device 133. The resonant ringing frequency of inductance 139 is arranged so that a pulse of desired shape and amplitude is obtained thereacross. This pulse is inductively coupled to inductances 141 and 142 of the phase detector 77.

The phase detector 77 functions to derive a voltage corresponding to the departure in phase of the oscillations generated by the oscillator generator 21′ from the phase of the oscillation generator 21 in response to the aforementioned pulse and a wave from the oscillation generating system 10′. This voltage is applied to a reactance tube 153 coupled with the receiving oscillator 21′ through conductor 153′ to maintain the latter in synchronism with the transmitting oscillator 21, thereby to permit a proper demodulation of the signal carrying pulses in the respective channels as will be described below.

Referring now to phase detector in detail, this detector is of a kind conventional in the art for detecting the variation in phase of pulses. It comprises a pair of unilaterally conducting devices 144 and 145. The cathode of device 144 is connected through biasing resistance 145*a* to a fixed bias point 146. The anode of device 145 is connected through biasing resistance 147 to fixed bias potential point 146. Between the cathode of device 144 and the anode of device 145 is connected in the order named a coupling and biasing capacitor 148, the secondary 149 of a transformer of which inductance 139 is the primary and a coupling and biasing capacitor 150. A wave from the oscillator generating system 10′ appearing on conductor 13′ is applied to the center tap of the winding 149. The anode of device 144 and the cathode of device 145 are connected together and through a resistance-capacitance network 142 to ground.

The time constant of the capacitance 148 and resistance 145*a* and of capacitance 150 and resistance 147 is so chosen that it is greater than the period of an alternating cycle of the applied alternating wave. The junction of resistances 145—147 is biased to a negative potential for maintaining proper bias on the reactance tube 153. Pulses from the device 133 are applied to the transformer secondary 149 in a negative polarity and to the transformer secondary 142 in a positive polarity. When the pulses occur at the zero amplitude portion of the applied sine wave, the operation of the detector is the same as in the absence of a pulse with zero output being obtained between point 151 and ground. Zero output being obtained under such circumstances since equal currents flow into and out of capacitance 78 on successive cycles. Of course, this point is biased to a potential of point 146. When the pulses occur at a time prior to the zero amplitude phase of the sine wave, the peak of wave applied to the diode 145 exceeds the peak of the sine wave and consequently, a net positive voltage is developed between point 151 and ground. Similarly, when the pulses occur at a time subsequent to the time of zero phase of the sine wave, negative pulses appear between the point 151 and ground. Thus, the average potential at the point 151 varies in a direction and to an extent dependent upon the direction and magnitude of departure of the phase of the applied sine wave with respect to the synchronizing signal applied to this detector. The capacitance 78 functions to average out the pulses of current at the output of the diodes 145 and 144 also to average out other transient effects such as keying transients.

The voltage at point 151 is applied to the reactance tube 152 which, in turn, is connected to the oscillator 21′ through conductor 155 to cause a corresponding change in the parallel resonant frequency of the resonant circuit in the anode circuit of this oscillator and thereby bring the phase of oscillations of this oscillator in phase with the oscillations of the oscillator 21 at the transmitter. The reactance tube 152 includes an electron discharge device 153 to the anode of which is applied an oscillation of one phase and to the grid of which is applied an oscillation of a phase lagging the phase of the oscillation applied to the anode. Thus, the current in the anode circuit of the device 153 lags the voltage appearing in this circuit by 90 degrees and effectively presents a reactance in shunt with the parallel resonant circuit of device 21′. The magnitude of this reactance is caused to vary by varying the D.-C. potential applied to the grid of device 153, which potential is obtained from the phase detector as pointed out above.

Referring now to the portion of the receiver of FIG. 2 designated channel I, the entire demodulated signal in the output of video amplifier 123 is applied over conductor 154 to the gating device 155. The gating device 155 is rendered operative to pass the desired pulses in a train of pulses to the demodulation circuits in response to a channel gating pulse as shown in graph *i* of FIG. 3 derived from the gate generator 156, the duration and time of occurrence of which is controlled by the clipper and amplifier 157. The time of occurrence of the leading edge of the gating pulse from the output of gate generator 156 is determined by the phase of the wave applied to the clipper and amplifier circuit 157. The phase of this wave is in turn determined by the ratio of resistances 159 and 160. This phase is made to correspond with the phase of the corresponding wave at the transmitting end of the system.

The clipper circuit generally designated 161 is substantially identical to the clipper circuit of the transmitting channel. Thus, at the output of the clipper and amplifier is obtained a wave, the leading edge of which coincides substantially at the point of zero amplitude of the wave applied between point 158 and ground. The application of this wave to the ringing circuit comprising inductance 162 shunted by a unilaterally conducting device 163 causes a single pulse to be developed negative in polarity, the leading edge of which coincides with the point of zero amplitude of the applied sine wave and the duration of which corresponds to the time allotted to channel I in the train of pulses. The biasing network 79 and diode 89 connected in series circuit between the anode of device 87′ functions to cause device 87′ to cutoff at substantially the zero amplitude phase of the wave applied to this device. The pulse from the output of device 87′ is applied to the gate generator 156, from the anode circuit of which is derived a gating pulse as shown at *l* in FIG. 3 which renders the diode gating circuit operative to pass the desired signaling pulse in successive trains of pulses.

The diode gating circuit comprises a diode 155 which has its cathode connected through conductor 154 to a resistance 164 in the cathode lead of video amplification 123 across which resistance appear the synchronizing and channel pulses. Its anode is connected through anode resistance 165 to ground. The anode is also coupled through a resistance 166 and a capacitance 167 to the anode of gate generator 156. Thus, in the absence of any pulse applied to the anode of the device 155, a high resistance, that is, the inverse resistance of the diode 155 is presented to the pulses at the output of the video amplifier 123 and thus, a low average potential appears on the grid of device 186 with a consequent drop in potential at the anode of this device. Upon the appearance of a positive pulse at the anode of the device 155, the latter is rendered conductive to pass the individual signal pulse from conductor 154 to the pulse amplifier 186 from which the pulse is coupled to the phase detector 169.

Also, connected to the phase detector 169 at one end of biasing network 172—173 over conductor 170 is a sawtooth wave from the sawtooth wave generation circuit 171, which is keyed by the pulse obtained from the gate generator 156. The sawtooth generator 167 is substantially identical to the sawtooth generator circuit 90 utilized in the transmitter.

The phase detector is substantially identical to the phase detector 143 of the synchronizing channel. Since the output of the phase detector 169 is capacitively coupled to the following stage the D.-C. level at the output thereof is not of any great significance; consequently, the biasing network in the input portion of the phase detector takes the form of a resistance 172 and a capacitance 173 connected between adjacent ends of the two secondary windings of the phase detector transformer 174. The operation of this phase detector is substantially identical to the operation of the phase detector of the synchronizing channel. On positive portions of the alternating potential applied to the phase detector, diode 175 conducts and on negative portions of the alternating wave, the diode 176 conducts in the absence of a pulse signal to develop a bias across the resistance 172-capacitance 173 network. The time constant of this network is arranged to be appreciably longer than the period of a cycle of the sawtooth wave. Accordingly, across this combination is developed bias corresponding to the peak to peak voltage of the sawtooth wave. The pulses from the pulse amplifier 186 are applied to the secondary winding of the transformer 177 in a negative phase while they are applied to the transformer secondary 178 in the positive phase. Accordingly, across capacitance 179 an output is obtained having one polarity when the pulses occur prior to the zero reference level of the sawtooth wave and having the opposite polarity when the pulses occur subsequent in time to the occurrence of the zero reference level of the sawtooth wave. It should be noted that the greater pulse from the zero reference level of the sawtooth, the greater is the amplitude of the voltage developed across the capacitance.

Thus, across the capacitance 179 is obtained a series of pulses, the amplitudes of which vary in accordance with the time modulation of these pulses. The output across the capacitance 179 is applied through a volume control resistance 180 to the input of audio amplifier 181 in the anode circuit of which is located a low pass filter 182 of a conventional design adapted to pass only the audio components in the output. The output filter is coupled to the audio output terminals 183.

Channels II and III of the receiver are essentially identical to channel I and hence are illustrated by respective rectangular boxes. Of course, the phase of the keying wave applied at terminals 159*a* and 159*b*, are so arranged that the enabling pulses developed in these channels have the required timing for providing sequential operation of these channels corresponding to that of channels II and III at the transmitter. The channel gating pulse of channel II is represented by graph *m* of FIG. 3.

In communication channels of the kind described above, it is highly desirable and necessary to perform signaling functions in addition to the communication function. For example, it is often necessary to perform supervisory and control functions in connection with the operation of each of the communication channels. By the use of a few additional elements in each of the channels, applicant has made it possible for two independent signaling functions to be performed in connection with each communication channel. In applicant's pulse position multiplex type system, one signaling function is effected by the keying either off or on of the channel or signal pulses and an additional signaling function is effected by the keying off and on periodically of the channel pulse at a predetermined rate.

To these ends there is provided at the transmitter in each of the channels a circuit of the kind shown in channel I. Normally, the bias at the input of amplifier 105 is maintained at a value by the voltage divider network comprising resistances 184, 185, and 186 connected across the source 66 to permit the pulses obtained at the output of the modulator 93 to be passed through the amplifier 105 to the modulator 11. The grid of device 105 is connected to the junction of resistances 184 and 185. By changing the bias on amplifier 105 by means of the switch 187 connected between ground and the junction of resistances 186 and 187 to render the amplifier 105 nonconductive, deletion of that pulse from the output train of pulses is achieved. Detection of such deletions in the respective channel at the receiver will be described below.

A separate signaling function is effected by the provision of a diode 188 having its anode connected through winding 104 to the grid 104 of device 105 and having its cathode connected to ground. An alternating potential from a source represented by block 189 is applied through a resistance 190 between ground and the point to which the anode of the diode 188 is connected. This causes periodic conduction in the diode 188 with consequent periodic blocking of the video amplifier 105. The periodic keying off and on of the channel pulses are detected in the receiver by means to be described below. The block 189 may also include a means for individually keying the diode 188 nonconductive to apply a negative potential to the device 105 to block the output thereof to achieve the first mentioned signaling function.

In each of the channels of the receiver in FIG. 2, is located a circuit of the kind to be presently described in connection with channel I for detecting individually the unilateral and periodic blocking of the channel pulse. The channel pulse obtained at the output of channel amplifier 186 is applied through a voltage dropping network 191 of resistances to the grid of the signaling circuit device 192, in the anode circuit of which is located a relay 193 having contacts connected to the signaling circuit output terminals 194. During the presence of channel pulses at the grid of device 186, grid current bias is developed across resistor 184 causing conduction in the relay 193 sufficient to energize the relay. The time constant of resistance 184 and capacitance 185 is chosen so as to be long compared to the individual channel pulse repetition rate, so that device 186 is held cutoff between individual channel pulses, by the above-mentioned grid current bias. Thus the duty cycle of conduction of device 186 is very small, and the average D.-C. potential at the anode of device 186 is close to the supply potential. Resistance divider 191 thus holds the grid of device 192 biased positive thereby causing conduction in the relay 193 sufficient to actuate this relay.

Upon deletion of the individual pulse in the transmitter train of pulses, grid current bias is no longer developed across resistance 184, and device 186 becomes continuously conducting. Thus the average D.-C. potential at the anode of device 186 will drop, and resistance divider 191 causes the grid of device 192 to become cutoff, thereby de-actuating the relay 193 to effectuate the signaling function at the output terminals 194. It may be desirable in the circuit shown to stabilize the screen grid current of the pulse amplifier 168 by means of the feedback resistor 195 connected from the anode of the device 192 to the screen grid of the pulse amplifier 168.

To demodulate the periodic removal of the channel pulses another circuit 196 comprising a full wave rectifier is provided. The opposite arms of the full wave rectifier are capacitively coupled in shunt with the signaling discharge device 192. The unilaterally conducting devices of the rectifier being poled to be conductive away from these arms toward the other arms diagonally across which is connected the solenoid of another signaling relay 197. The contacts of relay 197 are connected to output signaling circuit contacts 198. With such an arrangement, periodic keying of the individual signal pulses causes an alternating output to appear at the input of the bridge rectifier circuit 196 across the output of which appears a current which actuates the solenoid of relay 197 thereby actuating signaling contacts 198.

Thus, by provision of a few simple elements to each of the channels of the transmitter and receiver of applicant's system two independent signaling functions in addition to the communication function may be had in each of the channels.

Thus applicant has provided a simple and effective pulse multiplex communication system. The fact that in this system the channel timing is relatively independent of the amplitude of signals or supply voltages obviates the necessity for accurate control of power supply voltages and makes the channel timing independent of tube characteristics. The use of a relatively low frequency, for example nine kilocycle, sine wave for synchronizing information makes it possible to locate channel units at some distance from the source of synchronization without having the synchronization information distorted by lengthy interconnecting wiring. The low frequency involved in applicant's system also reduces the possibility of radiating power which may cause interference with other equipment. Additionally, the method of selecting channel pulses intermediate between the quadrature phases by means of a pair of resistors can be made very accurate and reliable at low cost.

While particular embodiments of my invention have been shown and described, it is apparent that changes and modifications may be made without departing from the invention in its broader aspects and therefore the aim in the appended claims is to cover all such changes and modifications as follow within the true spirit and scope of my invention.

What I claim as new and desire to secure by Letters Patent of the United States is:

1. The combination, in a square wave generator, of a pair of resistances connected in series, each resistance having in shunt therewith a respective unilateral conducting device, said unilateral conducting devices being poled oppositely, and being of such low impedance in the conducting direction as substantially to short circuit the resistance in shunt therewith, a source of oscillations connected across said pair of resistances whereby alternate half cycles of said oscillations are passed by one of said unilateral conducting devices and appear on the other of said resistances, and the intermediate half cycles are passed by the other of said unilateral conducting devices, and appear on the resistance in shunt with said one unilateral conducting device, and a limiter connected across one of said resistances to transmit the pulses produced thereon with limited amplitude form whereby the output is of substantially square wave form.

2. In combination, in a pulse multiplex system, means for deriving a pair of waves differing in phase one with respect to the other, a pair of resistances equal in magnitude and connected in series, means for applying one of said waves through a third resistance in series circuit with said series combination and for applying the other of said waves through a fourth resistance in series circuit with said series combination, a pair of unilaterally conducting devices each connected in shunt across a respective resistance, said devices being poled to be conductive in opposite directions, one with respect to the other, whereby across each of said resistances is obtained a wave of one polarity, means for limiting the amplitude of said wave, whereby a square wave is obtained the time of occurrence of which is dependent only on said resistances and is substantially independent of the amplitude of said waves.

3. The combination in a pulse multiplex system, a source of oscillations of a predetermined frequency, means for deriving from said source oscillations of the opposite phase with respect to the phase of the oscillations from said source, means for deriving oscillations in phase quadrature with respect to the oscillations from said source, means for deriving oscillations of the opposite phase with respect to said last derived oscillations, reistor means for combining different pairs of said oscillations derived by said last three means for deriving a plurality of waves, each of said plurality of waves being in different phase relationship with respect to each of the other of said waves, means responsive to the phase of each of said derived waves for deriving respective groups of impulses, each impulse in a train of impulses being displaced in time with respect to every other impulse in said train in accordance with the displacement in phase of a respective wave with respect to the other waves.

4. In a pulse multiplex system, a source of sine wave voltage of a predetermined frequency, means for deriving from said sine wave a plurality of sine waves each differing in phase from said first wave and from the other sine waves derived therefrom, means for deriving a square wave from each of said derived sine waves, the leading edge of which occurs substantially at the time of zero amplitude of said sine waves, means responsive to the leading edge of said square wave to derive a signal pulse.

5. In a pulse multiplex system, a source of sine wave voltage of a predetermined frequency, means for deriving from said sine wave a plurality of sine waves each differing in phase from said one sine wave and from the other of said derived sine waves, a plurality of channels, means in each channel for deriving a square wave from a corresponding one of said derived sine waves, the leading edge of which occurs substantially at the time of zero amplitude of the respective sine wave, means in each channel responsive to the leading edge of said square wave to render the respective channel operative for a predetermined interval whereby said channels are rendered operative in sequence and in fixed phase relation with said first mentioned sine wave voltage irrespective of variation in frequency thereof.

6. A pulse generating system for operatively conditioning, in a required order relationship, the different channels in a pulse type multiplex communication system comprising a source of sine wave oscillations, means for deriving from said source a plurality of sine wave oscillations of the same predetermined frequency as said source, each of said sine waves being in different phase relationship with respect to each of the other of said oscillations and having fixed phase relation to the oscillations of said source, means in each channel responsive to the zero reference voltage of one of said derived oscillations for developing a respective series of pulses, each series of pulses being displaced in time with respect to every other series of pulses in accordance with the displacement in phase of the respective derived oscillation with respect to the other derived oscillations.

7. In combination in a pulse multiplex system, a transmitting system and a receiving system, a plurality of signal channels in each system, means for rendering corresponding channels in the said transmitting and receiving systems conductive during successive intervals, means responsive to said conductive condition in the different signal channels of the transmitting system to supply corresponding signal pulses to said receiving system, means responsive to the corresponding conductive condition in the different signal channels in the receiving system to render said channels operative to receive the corresponding signal pulses from said transmitting system, whereby successive trains of pulses are transmitted by said transmitting system and received by said receiving system, means in each signal channel of said transmitting system to modulate in time position, to key off continuously, and to key off and on periodically, the pulses transmitted in response to said conductive condition therein in accordance with signals to be transmitted, and means in the corresponding signal channels of said receiving system to demodulate said pulses, to reproduce the desired signal and individually responsive to the keying off continuously, and to the keying off and on periodically of said pulses to actuate respective signal devices.

References Cited in the file of this patent

UNITED STATES PATENTS

| | | |
|---|---|---|
| 2,195,853 | Fitch | Apr. 2, 1940 |
| 2,403,561 | Smith | July 9, 1946 |
| 2,426,187 | Earp | Aug. 26, 1947 |
| 2,459,131 | Mesner | Jan. 11, 1949 |
| 2,541,076 | Labin et al. | Feb. 13, 1951 |
| 2,680,151 | Boothroyd | June 1, 1954 |
| 2,753,452 | McCardle | July 3, 1956 |